United States Patent
Kobayashi

(10) Patent No.: US 6,996,967 B2
(45) Date of Patent: Feb. 14, 2006

(54) CABLE SUPPORT STRUCTURE

(75) Inventor: Yoshinao Kobayashi, Yokkaichi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 103 days.

(21) Appl. No.: 10/608,694

(22) Filed: Jun. 27, 2003

(65) Prior Publication Data

US 2004/0250525 A1 Dec. 16, 2004

(30) Foreign Application Priority Data

Jul. 1, 2002 (JP) ............................ P2002-191682

(51) Int. Cl.
*F16G 13/00* (2006.01)

(52) U.S. Cl. ..................... 59/78.1; 59/900; 248/49; 248/51; 174/72 A

(58) Field of Classification Search ................. 59/78.1, 59/900; 248/49, 51
See application file for complete search history.

(56) References Cited

U.S. PATENT DOCUMENTS

| | | | |
|---|---|---|---|
| 4,852,342 A | * | 8/1989 | Hart ........................... 59/78.1 |
| 5,581,944 A | | 12/1996 | Kornbrekke et al. |
| 6,174,020 B1 | * | 1/2001 | Knettle et al. ............... 296/155 |
| 6,416,022 B1 | * | 7/2002 | Crespi ........................... 248/49 |
| 6,612,104 B1 | * | 9/2003 | Blase ........................... 59/78.1 |
| 6,781,058 B1 | * | 8/2004 | DeCicco et al. ............. 59/78.1 |
| 6,787,702 B1 | * | 9/2004 | Suzuki ........................ 59/78.1 |

FOREIGN PATENT DOCUMENTS

| | | |
|---|---|---|
| DE | 199 48 852 | 8/2001 |
| EP | 0 173 829 | 3/1986 |
| JP | 2003-25850 | 1/2003 |

* cited by examiner

*Primary Examiner*—David B. Jones
(74) *Attorney, Agent, or Firm*—Hamre, Schumann, Mueller & Larson, P.C.

(57) ABSTRACT

When a cable support structure according to the present invention is applied to a slide door in a vehicle, a first support member (20) and a second support member (30) support one end portion and another end portion in a cable guide (1) in a state capable of swinging them in a vertical direction approximately perpendicular to a sliding direction (Q) of a slide door (SD). Accordingly, even in the case where an attitude angle of the slide door (SD) with respect to the vertical direction is changed in correspondence to the slide movement, or a vertical position is changed, it is possible to prevent an unreasonable force from being applied to the cable guide (1) on the basis of the above-described attitude or position change.

5 Claims, 13 Drawing Sheets

F I G. 1 4
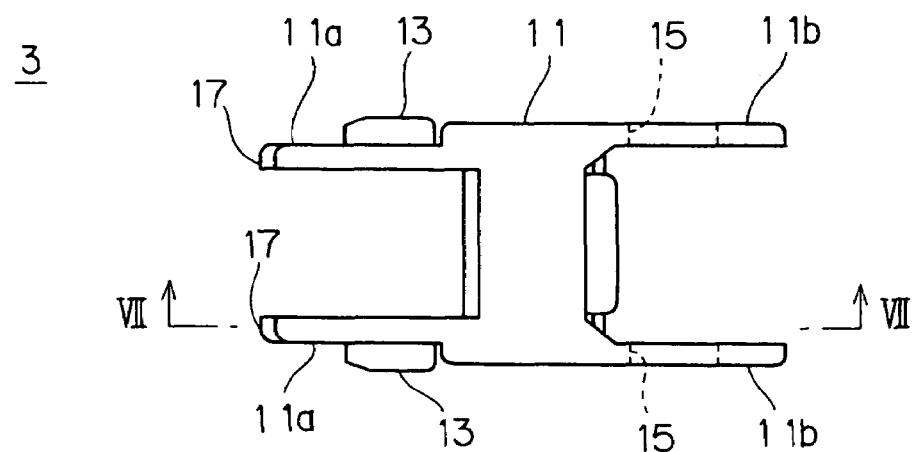
F I G. 1 5
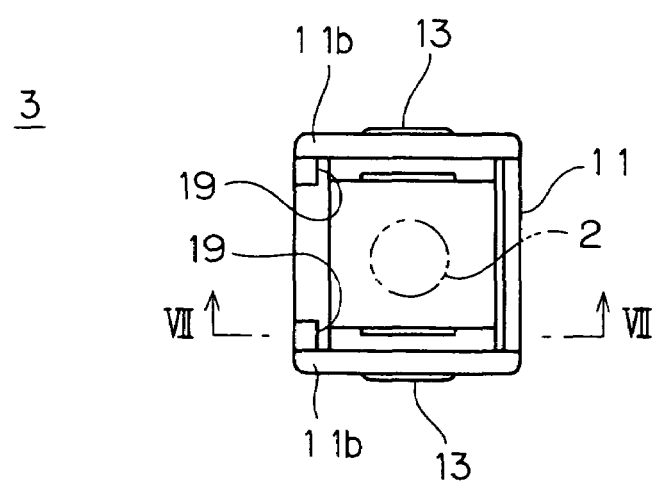

F I G. 1 6
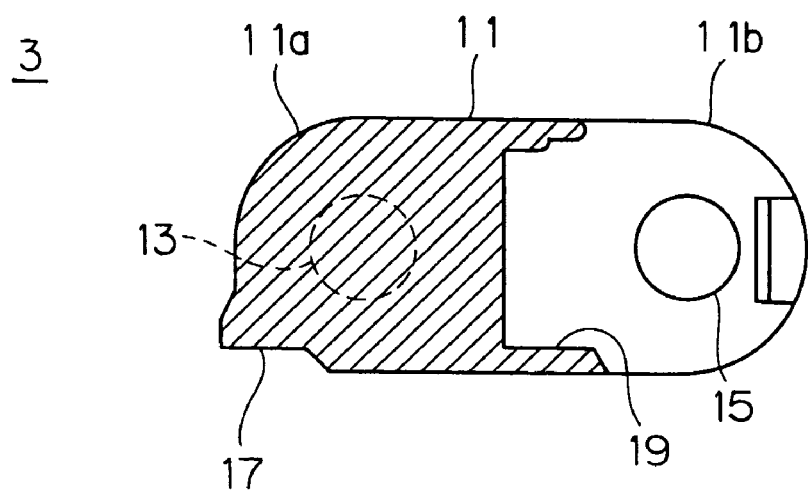
F I G. 1 7
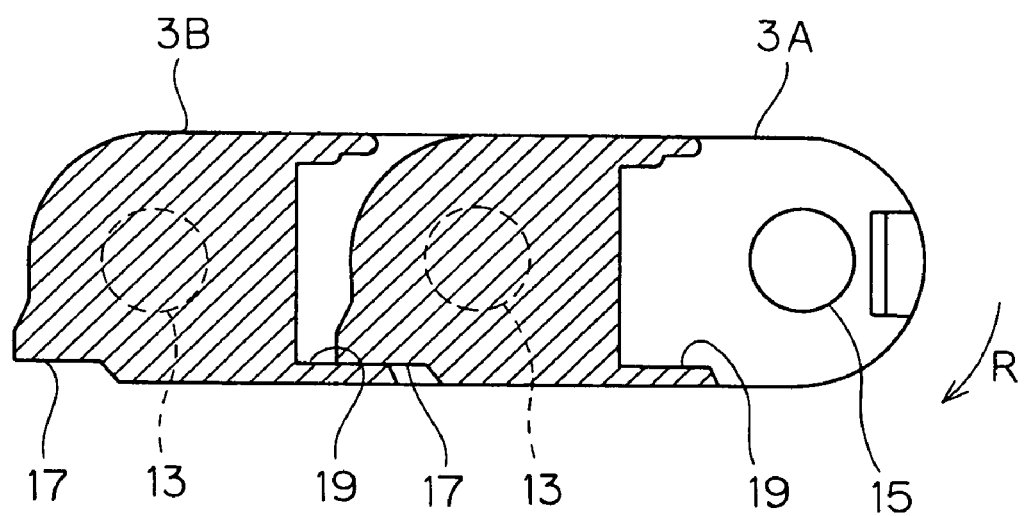

F I G. 1 9
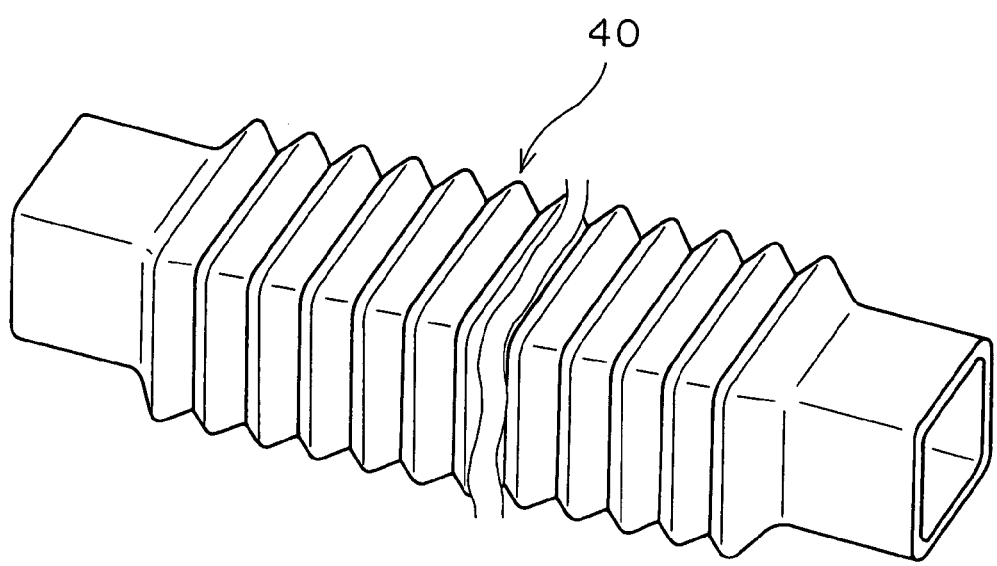

CABLE SUPPORT STRUCTURE

BACKGROUND OF THE INVENTION

1. Field of the Invention

The present invention relates to a cable support structure for supporting a cable which is arranged between relatively moving two members.

2. Description of the Background Art

Conventionally, there is, for example, a structure that impinging type terminals are provided on a slide door side of a vehicle and a vehicle main body side and, when the slide door is closed, the terminal in the door side and the terminal in the vehicle main body side are impinged so as to be electrically connected, whereby an electric current is fed from the vehicle main body side to the door side via both the terminals.

However, in the conventional structure, there is a problem in that the electric current can be fed to the slide door at the time when the slide door is closed, but the electric current can not be fed in a state where the slide door is open.

Accordingly, there is proposed a structure that a cable is arranged between the slide door and the vehicle main body, and the cable is arranged so as to be inserted into a cable guide.

In this case, in accordance with the structure of the vehicle, there is the structure that an attitude angle of the slide door is changed in a vertical direction perpendicular to a slide moving direction of the slide door, in correspondence to the slide movement at the time when the slide door is opened and closed. For example, there is a case where the slide door is obliquely slanted with respect to the vertical direction from a state where the slide door is arranged approximately parallel to the vertical direction in a state where the slide door is completely closed, in correspondence that the slide door is slid and opened, and the angle of slant is gradually increased.

Accordingly, with respect to the vehicle having the structure, it is necessary to employ a device which can correspond to the change in the attitude angle with respect to the vertical direction of the slide door in correspondence to the slide movement. Further, in some set angle of the sliding direction of the slide door, there is a case where a vertical position of the slide door with respect to the vehicle main body changes in the vertical direction in correspondence to the slide movement, so that it is necessary to employ a device which can correspond to the vertical motion of the slide door.

SUMMARY OF THE INVENTION

Accordingly, an object of the present invention is to provide a cable support structure which can correspond to a change in attitude angle and a change in position with respect to a vertical direction of each of members in correspondence to the movement of two members.

According to one aspect of the present invention, a cable support structure for supporting a cable arranged between a first member and a second member which relatively move along a predetermined moving direction, includes: a cable guide, formed by a plurality of linearly connected link members, for guiding the cable; a first support member, provided on the first member side, for supporting one end portion of the cable guide; and a second support member, provided on the second member side, for supporting another end portion of the cable guide, wherein at least one of the first support member and the second support member supports the one end portion or the another end portion of the cable guide in a state capable of swinging it in a vertical direction approximately perpendicular to the predetermined moving direction.

Accordingly, even in the case where the attitude angle of the first member or the second member with respect to the vertical direction changes in correspondence to the movement or the vertical position changes, it is possible to prevent an unreasonable force from being applied to the cable guide on the basis of the change in attitude or position, so that it is possible to correspond to the change in attitude angle and the change in position of the first member or the second member with respect to the vertical direction.

Further, in the case of the structure that both the first support member and the second support member support one end portion and another end portion of the cable guide in the state capable of swinging them in the vertical direction, respectively, it is possible to more securely prevent the unreasonable force from being applied to the cable guide on the basis of the change in attitude angle and the change in position of the first member or the second member with respect to the vertical direction in correspondence to the movement, and it is possible to more securely correspond to the change in attitude angle and the change in position of the first member or the second member with respect to the vertical direction.

Objects, features, aspects and advantages of the present invention will be more apparent from the following detailed description and the accompanying drawings.

BRIEF DESCRIPTION OF THE DRAWINGS

FIG. 14 is a side view of a link member forming a cable guide;

FIG. 15 is a front view of the link member in FIG. 14;

FIG. 16 is a cross sectional view taken along line VII—VII in FIGS. 14 and 15;

FIG. 17 is a cross sectional view showing a state where link members are connected to each other so as to be freely bent in one direction;

FIG. 19 is a perspective view showing a tube body covering a cable guide.

DESCRIPTION OF THE PREFERRED EMBODIMENTS

Hereinafter, description will be given of a cable support structure according to an embodiment of the present invention. In the present embodiment, the description is given of an embodiment in which a cable support structure is applied to a vehicle main body and a slide door; however, a subject to be applied is not limited thereto. The present cable support structure can be applied to a first member and a second member which relatively move along a predetermined moving direction.

Figure 1:
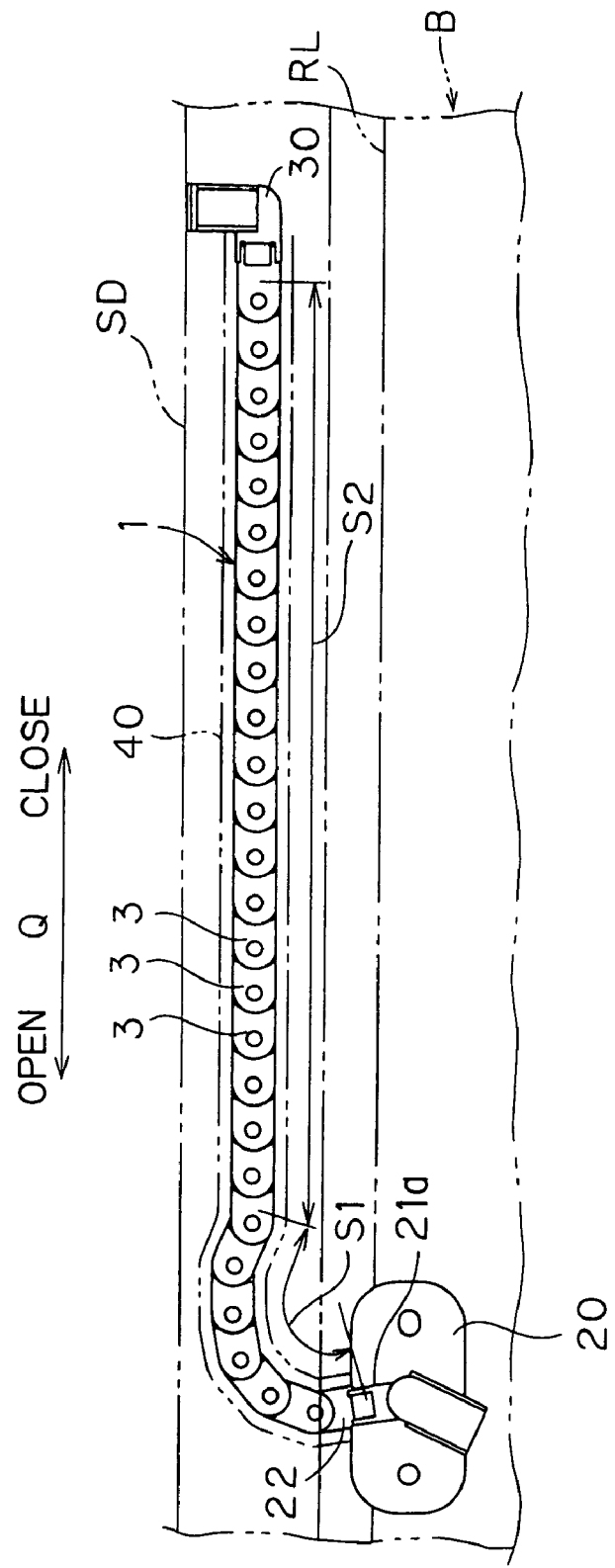
FIG. 1 is a schematic plan view showing a cable support structure (in a full-close state) according to an embodiment of the present invention.
Figure 2:
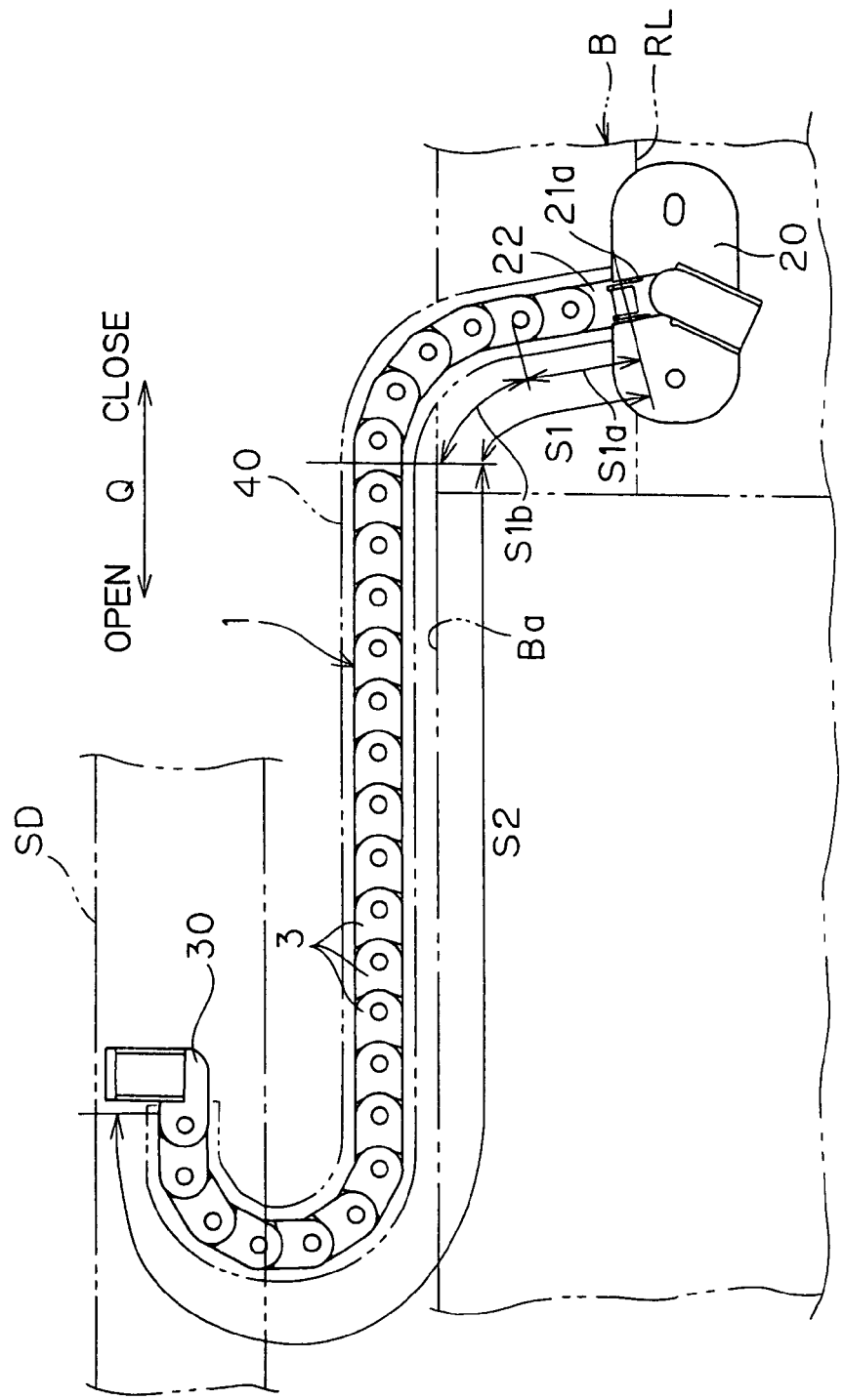
FIG. 2 is a schematic plan view showing the cable support structure (in a full-open state) in FIG. 1.
Figure 3:
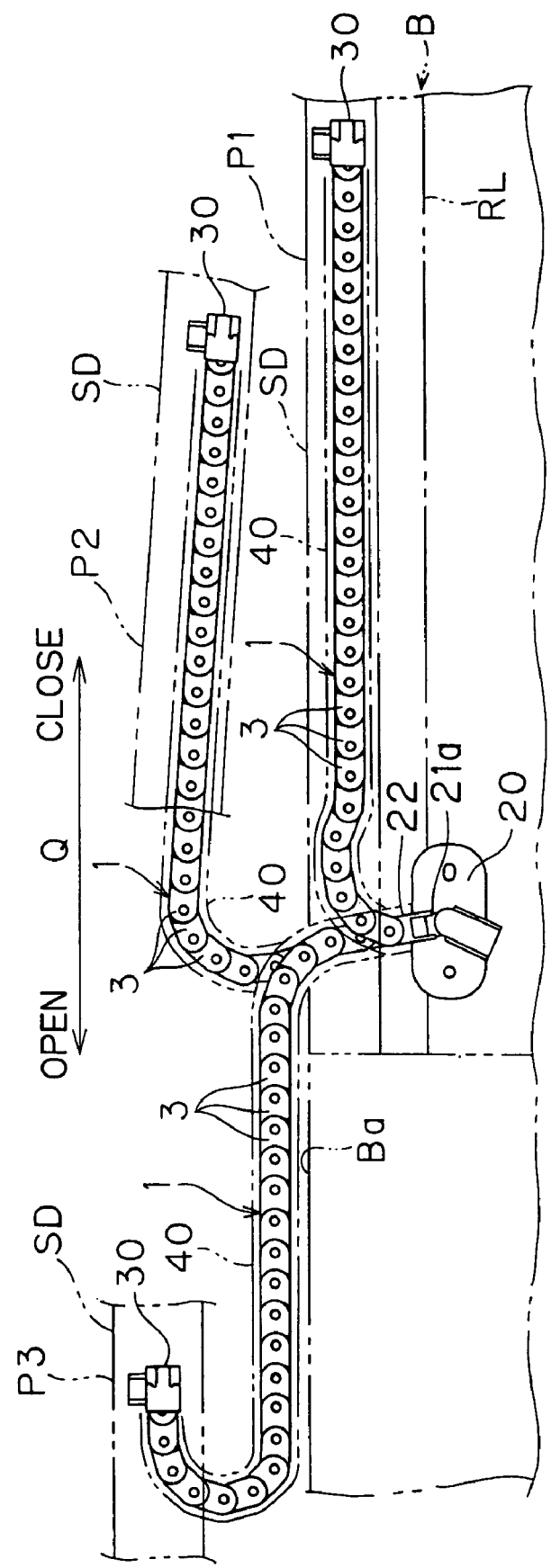
FIG. 3 is a schematic plan view showing a state where a slide door is opened and closed in the cable support structure in FIG. 1.

FIG. 1 is a schematic plan view of the cable support structure in a state where a slide door SD is closed, FIG. 2 is a schematic plan view of the cable support structure in a state where the slide door SD is opened, and FIG. 3 is a view showing a state when the slide door SD is opened and closed.

This cable support structure is structured such as to guide bending of a cable 2 (shown only in FIG. 15) arranged between a vehicle main body B and a slide door SD, as shown in FIGS. 1 to 3, and is provided with a cable guide 1, the cable 2, a first support member 20 and a second support member 30 which support one end portion and another end portion of the cable guide 1, respectively.

The cable 2 includes at least one electric wire for feeding an electric current to the slide door SD and an electric wire for transmitting and receiving signals between the slide door SD and the vehicle main body B, and is arranged between the vehicle main body B and the slide door SD.

The cable guide 1 is formed by a plurality of linearly connected link members (piece members) 3. One end portion of the cable guide 1 is supported to the vehicle main body B by a first support member 20, and another end portion thereof is supported to the slide door SD by a second support member 30 which will be described later. The cable 2 is inserted into each of the link members 3 of the cable guide 1, thereby guiding the bending of the cable 2. In FIG. 3, a position P1 shows a state where the slide door SD is completely closed (a full-close state), a position P2 shows a state where the slide door SD is partly opened (a partly-open state), and a position P3 shows a state where the slide door SD is completely opened (a full-open state).

The first support member 20 is made by a resin or the like, and is firmly fixed to the vehicle main body B via a screw (not shown) or the like. More specifically, it is firmly fixed to a lower portion of a door frame in the vehicle main body B.

Figure 4:
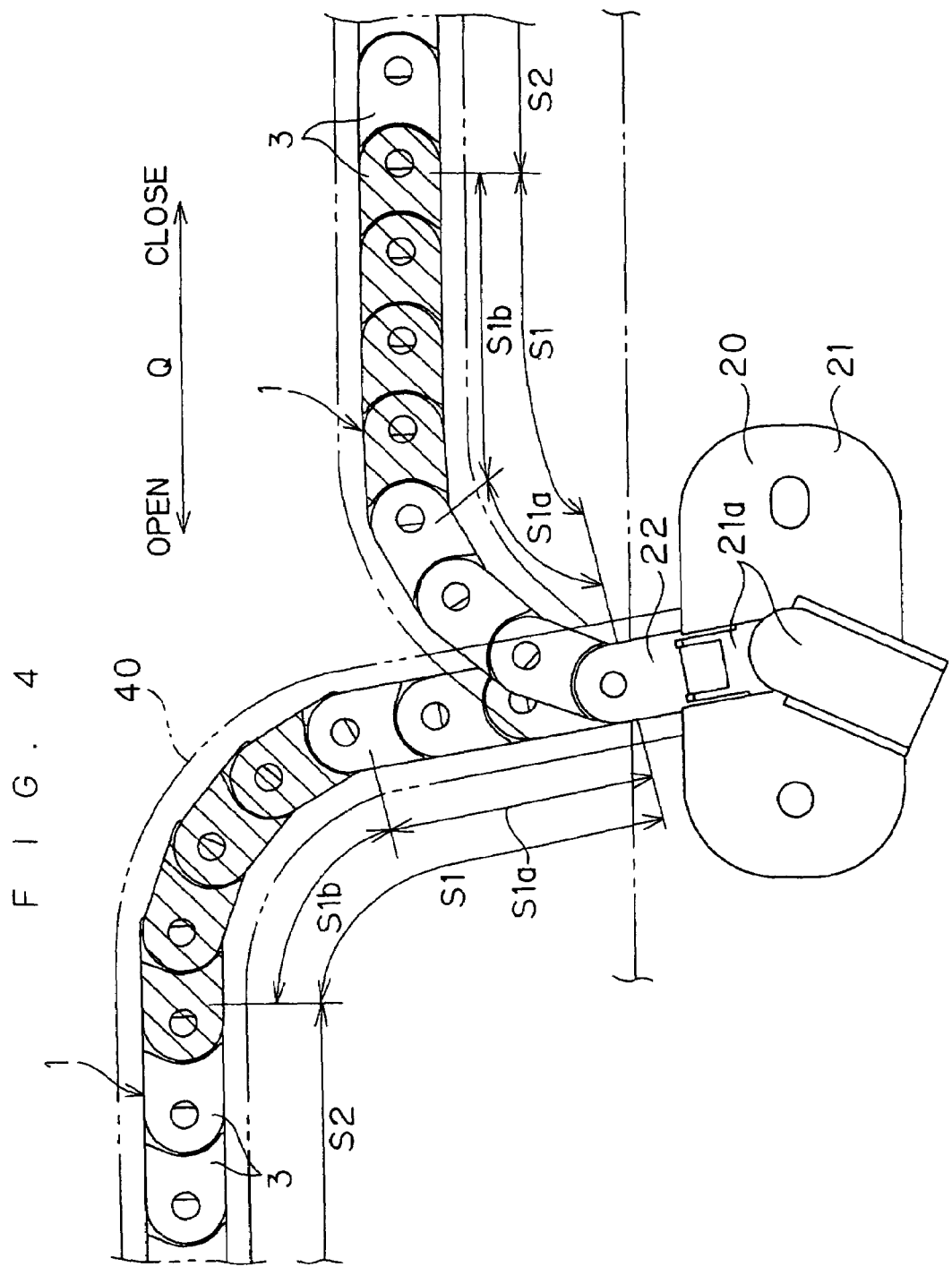
FIG. 4 is an enlarged view of a main part of a vehicle main body in the cable support structure in FIG. 1.
Figure 5:
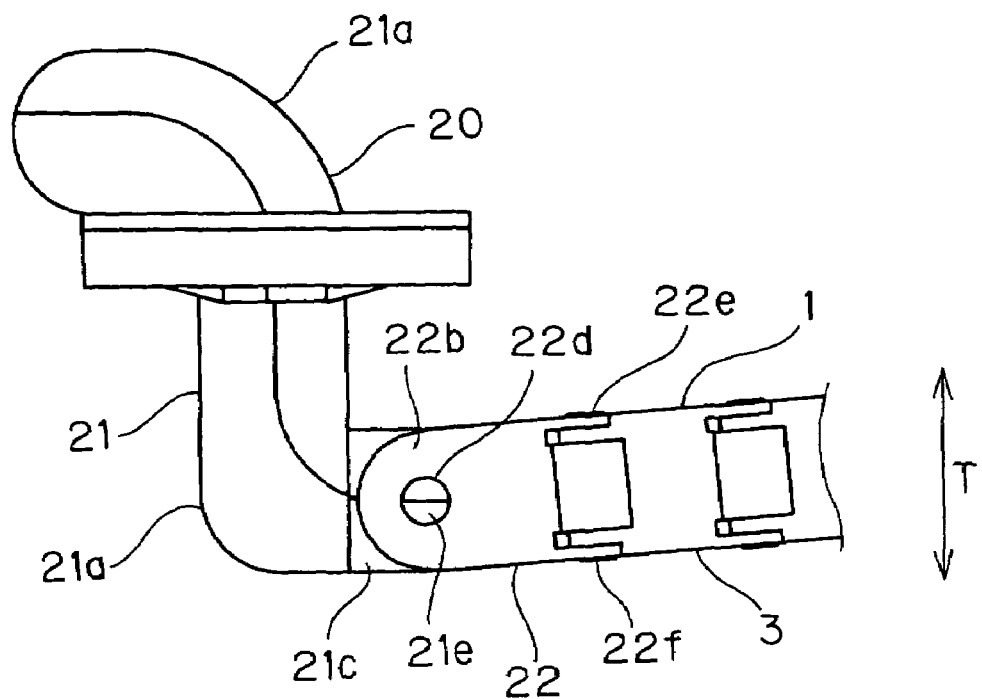
FIG. 5 is an enlarged view of a main part of the vehicle main body in the cable support structure in FIG. 1.

As shown in FIGS. 4 and 5, the first support member 20 is provided with a fixation member (a first fixation member) 21 fixed to the vehicle main body B by the screw or the like, and a connection member (a first connection member) 22 interposed between one end portion of the cable guide 1 and the fixation member 21. Further, the first support member 20 is connected to one end portion of the cable guide 1, and supports one end portion of the cable guide 1 in a state capable of swinging in a vertical direction T approximately perpendicular to a sliding direction Q of the slide door SD.

Figure 6:
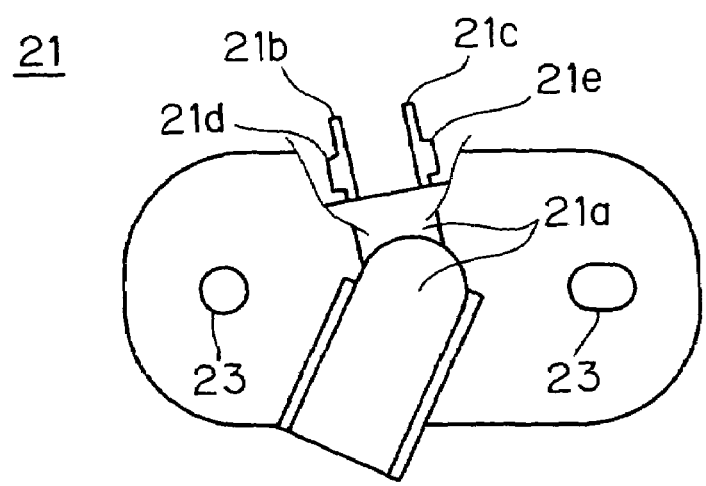
FIG. 6 is a view showing a structure of a fixation member of a first support member in a partly ruptured manner.

As shown in FIG. 6 in a partly ruptured manner, the fixation member 21 is provided with a guide tube portion 21a for guiding out the cable 2 from the vehicle main body B side. Extended portions 21b and 21c formed by extending left and right sidewalls of a leading end portion of the guide tube portion 21a and used for connecting to the connection member 22 are provided in the leading end portion of the guide tube portion 21a. Convex portions 21d and 21e protruding to left and right outer sides are respectively provided in side surfaces of both the extended portions 21b and 21c. In FIG. 6, a reference numeral 23 denotes a fixation hole for fastening by screw or the like.

Figure 7:
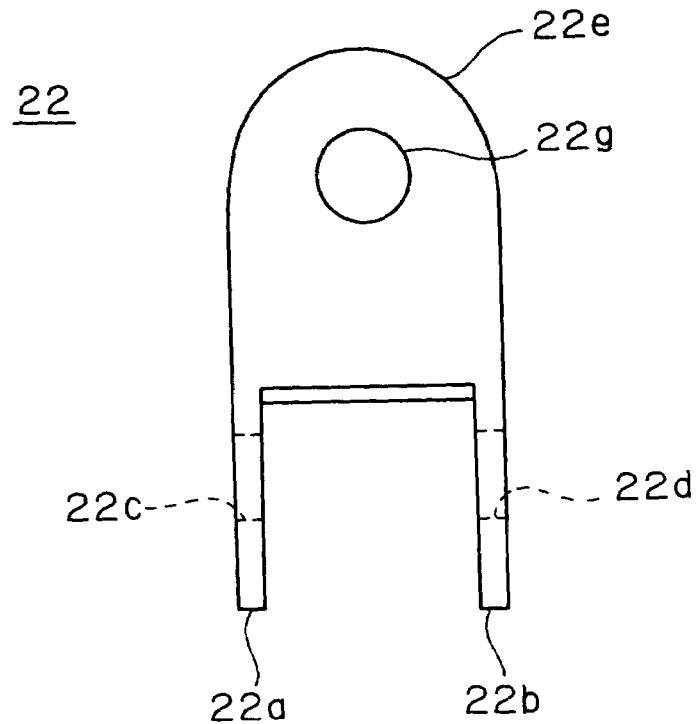
FIG. 7 is a view showing a structure of a connection member of the first support member.

As shown in FIG. 7, the connection member 22 has a tubular shape into which the cable 2 can be inserted, and is provided with extended portions 22a and 22b formed by extending left and right sidewalls and used for connecting to the fixation member 21 in one end side connected to the fixation member 21. Both the extended portions 22a and 22b are provided with receiving portions (herein, receiving holes) 22c and 22d to which both the convex portions 21d and 21e of the fixation member 21 are fitted from inner sides so as to be axially supported. Another end side of the connection member 22 is provided with extended portions 22e and 22f formed by extending upper and lower sidewalls and used for connecting to the cable guide 1. Both the extended portions 22e and 22f are provided with receiving portions (herein, receiving holes) 22g to which both upper and lower convex portions 13 (see FIG. 14), which will be described below, in one end portion of the cable guide 1 are fitted from inner sides so as to be axially supported, respectively.

The fixation member 21 and the connection member 22 are connected by fitting both the convex portions 21d and 21e of the fixation member 21 to both the receiving portions 22c and 22d in one end side of the connection member 22 from the inner sides. Accordingly, the fixation member 21 axially supports the connection member 22 connected to one end portion of the cable guide 1 in such a manner as to freely rotate around an axis corresponding to the vertical direction T. In another end side of the connection member 22, the convex portions 13 of one end portion of the cable guide 1 is fitted to both the receiving portions 22g from the inner sides, whereby the cable guide 1 is connected. Further, in the connection portion, one end portion of the cable guide 1 can be bent approximately in a horizontal direction.

The cable 2 is guided out to the outer side of the vehicle main body B from the vehicle main body B side through the inner side of the guide tube portion 21 and further through the inner side of the connection member 22, and guided so as to be inserted into the cable guide 1.

Further, a tail end portion of the guide tube portion 21 a in the fixation member 21 is formed so as to be directed to a direction which is not parallel to the sliding direction Q and be directed to the side of the slide door SD. One end portion of the cable guide 1 and one end portion of the cable 2 are supported via the connection member 22 by this tail end portion of the guide tube portion 21a. More specifically, the tail end portion of the guide tube portion 21a is provided so as to be slightly slanted to a rear side of the vehicle main body B (a direction moving apart from the second support member 30 in the full-close state). As a result, one end portion of the cable guide 1 and one end portion of the cable 2 is supported by the guide tube portion 21a so as to be directed toward the slightly oblique rear side with respect to the vehicle main body B.

The second support member 30 is made by a resin or the like, and is firmly fixed to the slide door SD via a screw (not shown) or the like. More specifically, it is firmly fixed to the lower portion of the slide door SD.

Figure 8:
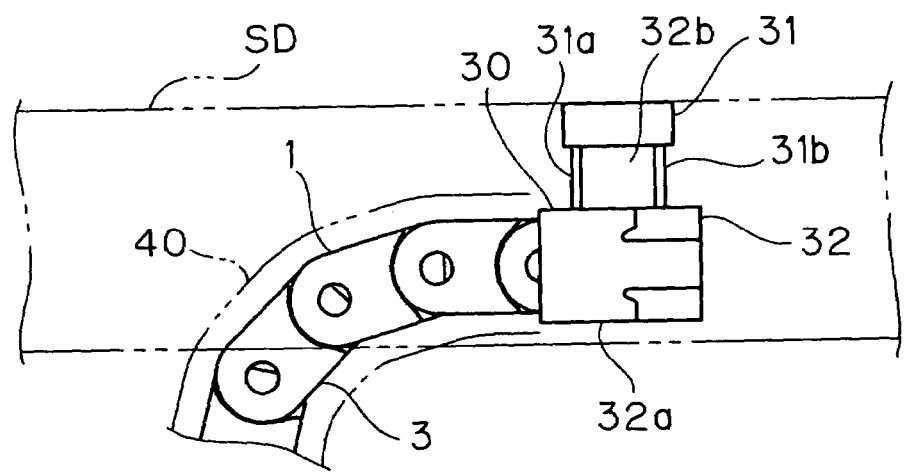
FIG. 8 is an enlarged view of a main part of a door in the cable support structure in FIG. 1.
Figure 9:
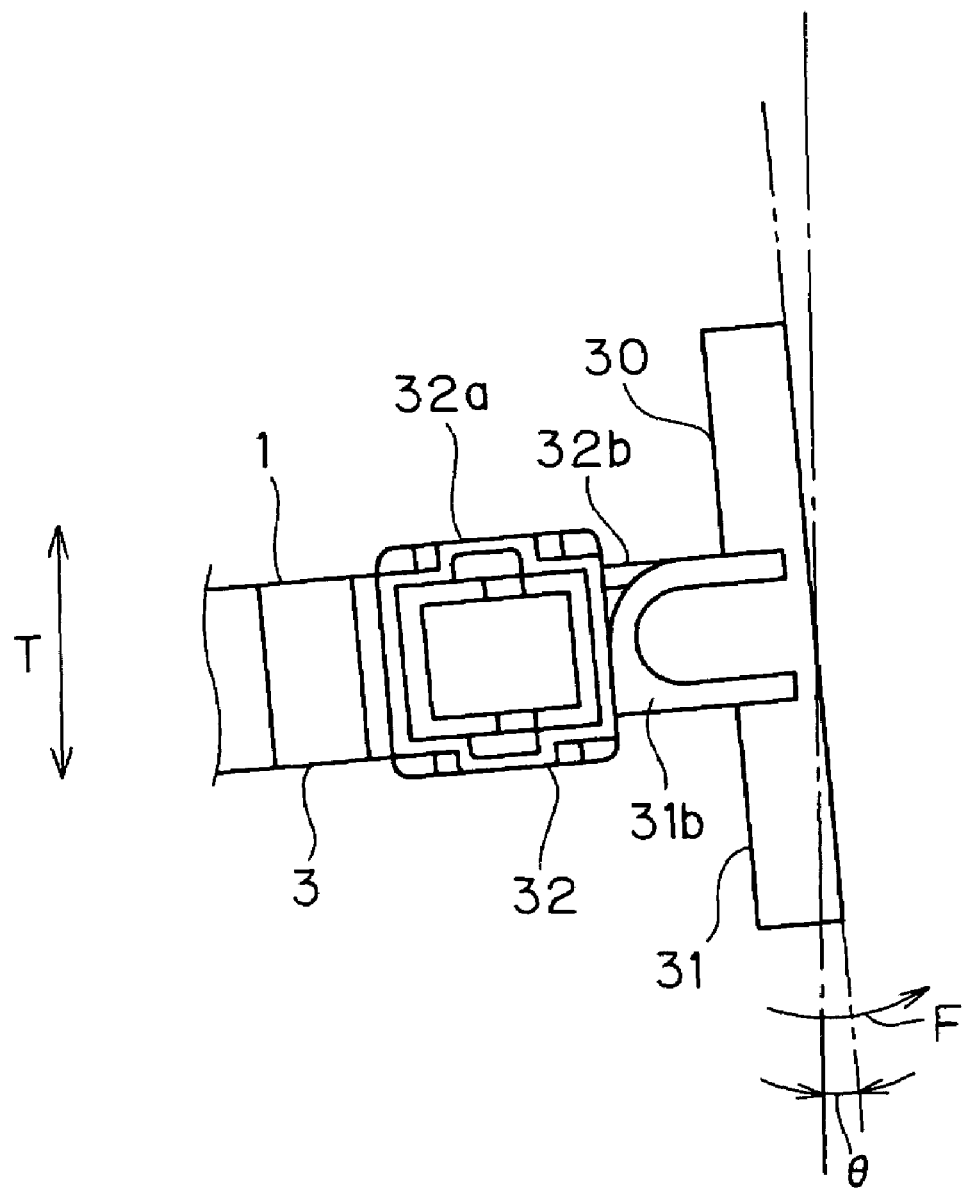
FIG. 9 is an enlarged view of a main part of the door in the cable support structure in FIG. 1.

As shown in FIGS. 8 and 9, the second support member 30 is provided with a fixation member (a second fixation member) 31 fixed to the slide door SD by the screw or the like, and a connection member (a second connection member) 32 interposed between another end portion of the cable guide 1 and the fixation member 31. Further, the second support member 30 is connected to another end portion of the cable guide 1, and supports another end portion of the cable guide 1 in a state capable of swinging in the vertical direction T.

Figure 10:
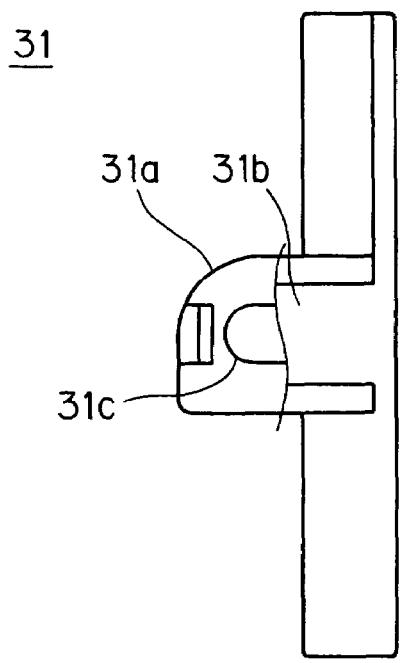
FIG. 10 is a view showing a structure of a fixation member of a second support member in a partly ruptured manner.
Figure 11:
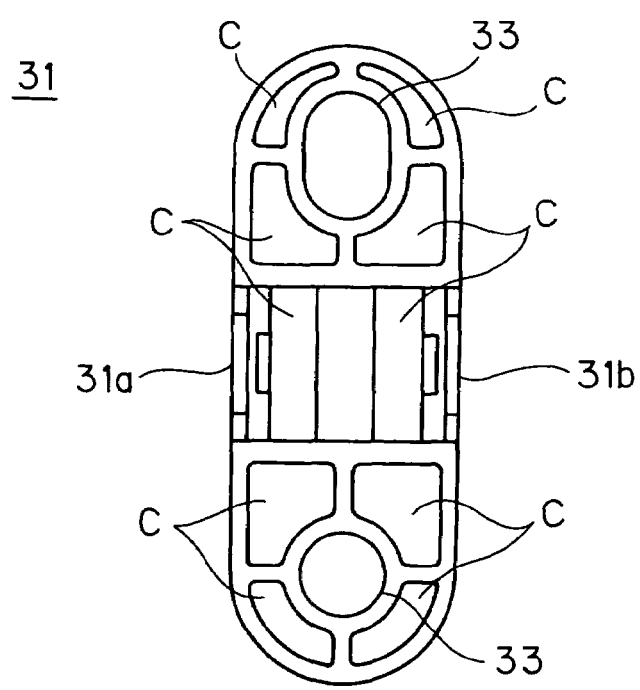
FIG. 11 is a view showing a structure of the fixation member of the second support member.

As shown in FIGS. 10 and 11, the fixation member 31 is provided with a pair of left and right protruding pieces 31a and 31b for connecting to the connection member 22. Receiving portions 31c to which convex portions 32f and 32g, which will be described later, of the connection member 32 are axially supported by being fitted from inner sides are provided in inner side surface of both the protruding pieces 31a and 31b, respectively. In FIG. 11, a reference numeral 33 denotes a fixing hole for fastening by screw or the like, and a reference symbol C denotes a blank portion for weight saving or the like.

Figure 12:
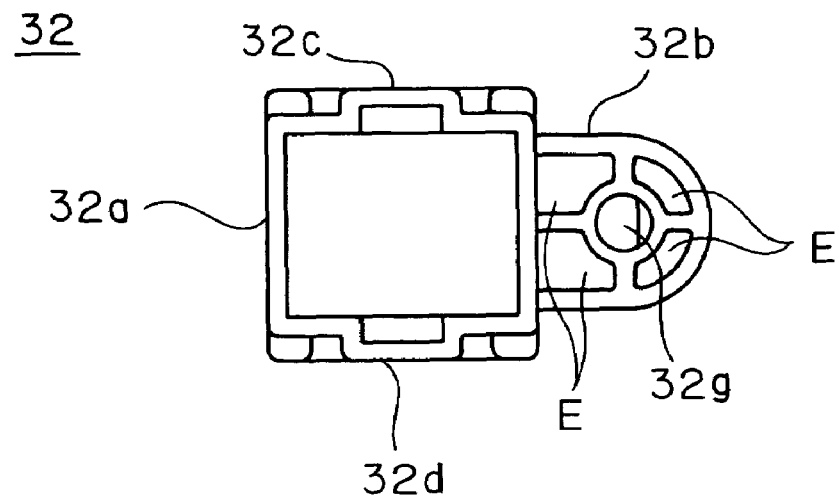
FIG. 12 is a view showing a structure of a connection member of the second support member.
Figure 13:
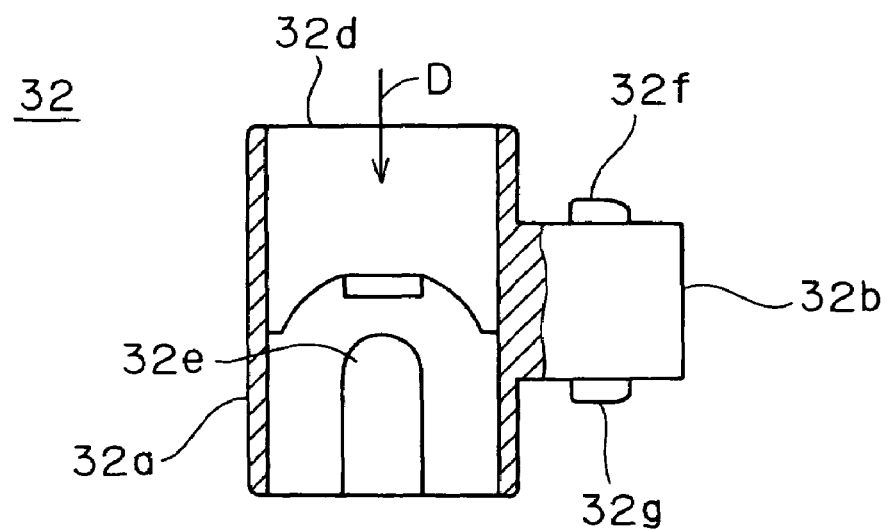
FIG. 13 is a view showing a structure of the connection member of the second support member in a partly ruptured manner.

As shown in FIGS. 12 and 13, the connection member 32 has a tubular holding portion 32a into which another end portion of the cable guide 1 is inserted so as to be held, and is provided with a protruding portion 32b for connecting to the fixation member 31 in an outer peripheral portion of the holding portion 32a. Engagement recess portions 32e to which the upper end lower convex portions 13 in another end side of the cable guide 1 are fitted and engaged are provided in inner surface sides of upper and lower sidewalls 32c and 32d of the holding portion 32a, respectively. When pressing another end portion of the cable guide 1 into the holding portion 32a as shown by arrow D in FIG. 13, the upper and lower convex portions 13 in another end portion are engaged with the engagement recess portion 32e, and the cable guide 1 is prevented from coming off and held. Convex portions 32f and 32g protruding in left and right directions are provided in left and right side surfaces of the protruding portion 32b. In FIG. 12, a reference symbol E denotes a blank portion for weight saving or the like.

Then, the connection member 32 and the fixation member 31 are connected by fitting both the convex portions 32f and 32g of the connection member 32 to the left and right receiving portions 31c of the fixation member 31 from the inner sides. Accordingly, the fixation member 31 axially supports the connection member 32 to which another end portion of the cable guide 1 is connected in such a manner as to freely rotate around the axis corresponding to the vertical direction T.

Further, the second support member 30 is located at a forward position of the vehicle in the first support member 20 in a state where the slide door SD is fully closed. In this state, the second support member 30 supports another end portion of the cable guide 1 and another end portion of the cable 2 so that the another end portions are directed toward the second support member 30 along the sliding direction Q. Further, when opening the slide door SD from this state, the second support member 30 is structured such as to move to the rear side crossing the side portion of the first support member 20. Accordingly, in the full-open state of the slide door SD, the second support member 30 supports another end portion of the cable guide 1 and another end portion of the cable 2 so as to be directed toward a direction moving apart from the first support member 20 along the sliding direction Q.

In view of the opening and closing structure of the slide door SD, in the full-open state of the slide door SD, the slide door SD is generally moved to some extent to the outer side of the vehicle main body B in comparison with the full-close state of the slide door SD. Accordingly, a distance between the first support member 20 and the second support member 30 in the direction orthogonal to the sliding direction Q of the slide door SD is larger in the full-open state than in the full-close state.

Herein, in the vehicle to which the present embodiment is applied, in correspondence to the slide movement at the time when the slide door SD is opened and closed, an attitude angle θ (see FIG. 9) of the slide door SD with respect to the vertical direction T is changed. More specifically, the slide door SD is inclined obliquely slanted in a direction shown by arrow F in FIG. 9 with respect to the vertical direction T from a state where the slide door SD is arranged approximately parallel to the vertical direction T in the full-close state, in correspondence to the slide movement. Accordingly, the slant angle (θ) of the slide door SD is gradually increased.

On the contrary, according to the present embodiment, the first support member 20 and the second support member 30 support one end portion and another end portion of the cable guide 1 in the state capable of swinging in the vertical direction T. Therefore, even when the attitude angle θ of the slide door SD with respect to the vertical direction T is changed in correspondence to the slide movement, it is possible to prevent the unreasonable force from being applied to the cable guide 1 on the basis of the attitude change.

Further, in some set angle of the sliding direction Q of the slide door SD, there is a case where the vertical position of the slide door SD is changed in the vertical direction T with respect to the vehicle main body B in correspondence to the slide movement. However, according to the present embodiment, since one end portion and another end portion of the cable guide 1 are supported by the first support member 20 and the second support member 30 in the state capable of swinging in the vertical direction T, it is possible to prevent the unreasonable force from being applied to the cable guide 1 on the basis of the change in the vertical position of the slide door SD.

In a basic structure of each of the link members 3 forming the cable guide 1, as shown in FIGS. 14 to 17, the link member 3 is provided with a barrel portion 11, a pair of convex portions 13 provided in one end portion of the barrel portion 11 and serving as a rotation axis, a pair of receiving portions 15 (herein, receiving holes) 15 provided in another end portion of the barrel portion 11 and axially supporting the convex portions 13 of the link member 3 corresponding to an opposing side to be connected, a pair of first contact portions 17 provided in one end portion of the barrel portion 11, and a pair of second contact portions 19 provided in another end portions of the barrel portion 11, and is made by a resin or the like.

The barrel portion 11 has an approximately rectangular tubular shape, and has an inner diameter into which the cable 2 can be inserted. The convex portion 13 is provided in each of extended portions 11a formed by extending mutually opposing portions (upper and lower sidewalls in FIG. 14) in an opening portion of one end portion in the barrel portion 11. The receiving portion 15 is provided in each of extended portions 11b formed by extending mutually opposing portions (upper and lower sidewalls in FIG. 14) in an opening portion of another end portion in the barrel portion 11. The convex portions 13 and the receiving portions 15 are provided so that an axis connecting the convex portions 13 in both sides and an axis connecting the receiving portions 15 in both sides are parallel to each other (in the same direction).

A width of both the extended portions 11b provided with the receiving portions 15 is set slightly larger than a width of both the extended portions 11a provided with the convex portion 13. Accordingly, in the connection portion of the link member 3, as shown in FIG. 17, both convex portions 13 of one link member 3A (see FIG. 17) are fitted to both receiving portions 15 of another link member 3B (see FIG. 17) from the inner sides. Accordingly, both the link members 3A and 3B are connected. In the state of being connected in this manner, the convex portions 13 are rotatably held in the receiving portions 15, whereby the bending angle can be changed in the connection portion between both the link members 3A and 3B.

The first and second contact portions 17 and 19 correspond to means for regulating a bending direction R (see FIG. 17) in the connection portion of the link member 3. That is, the first and second contact portions 17 and 19 are provided at positions at which two link members 3A and 3B can be brought into contact with each other at a time when the link members 3A and 3B are connected, whereby two connected link members 3A and 3B can be brought into contact with each other in a linearly extended state. Further, the bending direction R in the connection portion is regulated so that one link member 3A is bent only in one bending direction R from the state where one link member 3A linearly extends with respect to another link member 3B, in accordance with the regulation of the contact portions 17 and 19.

That is, when connecting the link members 3 shown in FIGS. 14 to 17 to each other, the link member 3 can be bent only in one direction from the linear state.

Figure 18:
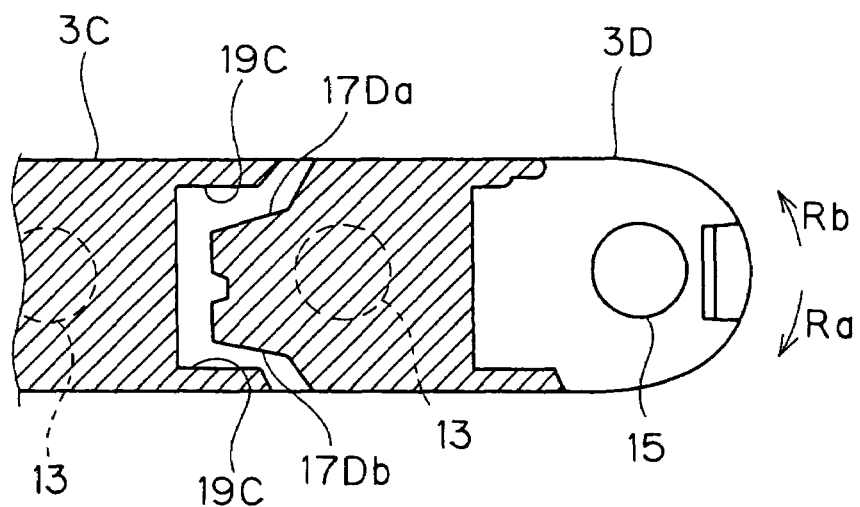
FIG. 18 is a cross sectional view showing a state where the link members are connected to each other so as to be freely bent in both directions.

In the case where it is desired to bend in both directions within a predetermined bending angle from the linear state, for example, a structure shown in FIG. 18 is employed. According to the embodiment of the structure shown in FIG. 18, in a state where the link members 3C and 3D are linearly extended, contact portions 17Da and 17Db of a link member 3D are a predetermined size apart from a contact portion 19C of a link member 3C. Further, the contact portions 17Da and 17Db are brought into contact with the contact portion 19C in a state where the link members 3C and 3D are bent at a predetermined angle to any one of bending directions Ra and Rb, whereby more bending is stopped.

As shown in FIGS. 1 and 2, the cable guide 1 is provided with a first section S1 at the vehicle main body B side and a second section S2 at the slide door SD side.

In the first section S1, the cable guide 1 is formed such as to be freely bent in both directions from the approximately linear state. A bending angle of the connection portion in each of the link members 3 in the section S1 is set in such a range that the cable guide 1 is not interfered with the member at the vehicle main body B side.

According to the present embodiment, the first section S1 includes a section S1a in which a plurality of link members 3 are connected so as to be freely bent only in one direction from the linear state, and a section S1b in which a plurality of link members 3 are connected so as to be freely bent in both directions from the linear state. That is, in the first section S1, all of the connection portions can not be bent in both directions, but can be bent in both the directions as a whole in a longitudinal direction.

The section S1a bendable only in one direction is set at the vehicle main body B side in the first section S1 and, herein, the section including one connection portion between the link member 3 and the first support member 20 and two connection portions between the link members 3 is set to the section S1a bendable only in one direction (see FIG. 4).

Further, the section S1b bendable in both the directions is set at the second section S2 side (the slide door SD side) in the first section S1 and, herein, the section including four connection portions between the link members 3 is set to the section S1b bendable in both the directions (see FIG. 4).

Further, in the state where another end portion of the cable guide 1 is pulled to a right side in FIGS. 3 and 4 (the full-close state of the slide door SD), a whole of the first section S1 is bent in a clockwise direction (in FIGS. 3 and 4). The bending angle of the connection portion between the links 3 in the first section S1 at this time is set in such a range that the cable guide 1 is neither interfered with the outer body of the slide door SD and nor interfered with a rail RL for the slide door SD at the vehicle main body B side.

On the other hand, in the state where another end portion of the cable guide 1 is pulled to a left side in FIGS. 3 and 4 (the full-close state of the slide door SD), the section S1a bendable only in one direction in the first section S1 turns into the linear state, and the section S1b bendable in both the directions is bent in a counterclockwise direction (in FIGS. 3 and 4). The bending angle of the connection portion between the link members 3 in the first section S1 at this time is set in such a range that the cable guide 1 is not interfered with a slide door frame rear body Ba in the side of the vehicle main body B. More specifically, the bending angle toward the rear side of the vehicle is zero degree in the section S1a bendable only in one direction in the first section S1, and the link can be bent at the bending angle 20 degrees in each of four connection members between the link members 3 in the section S1b bendable in both the directions. Further, the first support member 20 supports one end portion of the cable guide 1 in an attitude that the first support member 20 is slanted at 10 degrees toward the rear side of the vehicle with respect to the direction orthogonal to the sliding direction Q. Accordingly, in the case where the bending angle becomes maximum in the section S1b, an angle which the end portion in the side of the door in the first section S1 formed with the direction orthogonal to the sliding direction Q is obtained by the formula 20 degrees×4+10 degrees=90 degrees. As a result, the second section S2 can be connected toward the rear side along the sliding direction Q.

That is, the cable guide 1 is arranged so as to be extended toward the second support member 30 by being bent in the first section S1 while being connected apart from the vehicle main body B side.

In particular, in the full-open state, it is extended out so as to move apart from the vehicle main body B side from the section S1a of the cable guide 1, and is bent toward the rear side of the vehicle main body B in the section S1b.

It is noted that the bending angle and the bending direction of the connection portion between the link members 3 in the first section S1 is appropriately changed in correspondence to an arranged position, a shape or the like of the various members (the body itself and the rail RL) at the vehicle main body B side.

The second section S2 is formed such as to be capable of being bent only in one direction from the approximately linear state.

Further, in the state where another end portion of the cable guide 1 is pulled to the right side in FIGS. 3 and 4 (the full-close state of the slide door SD), the second section S2 is extended linearly toward the second support member 30. On the other hand, in the state where another end portion of the cable guide 1 is pulled to the left side in FIGS. 3 and 4 (the full-open state of the slide door SD), the second section S2 is bent in a clockwise direction (in FIGS. 3 and 4), and is extended toward the second support member 30 while being reversed in an approximately transversal J-shape.

Further, the cable guide 1 is coated with a tube body 40 shown in FIG. 19.

The tube body 40 is made of an elastic material such as a rubber, an elastic plastic or the like, and is formed in a bendable tubular shape. According to the present embodiment, for the purpose of being specifically easily bent, it is formed in a bellows tube shape; however, it is not necessary that it is always formed in the bellows tube shape.

In the cable support structure of the slide door SD structured in the manner described above, in the full-close state of the slide door SD, the whole of the first section S1 is bent in a clockwise direction, and the second section S2 is extended in the approximately linear state (a first bending mode).

When opening the slide door SD from this state, in the first section S1, the section S1a bending only in one direction is extended linearly, and the section S1b bending in both the directions is bent in the reverse direction. Subsequently, since the bending direction is limited to one direction in the second section S2, it is gradually bent from the link member 3 at the first section S1 side toward the link member 3 at the slide door SD side. Therefore, the bending mode of the cable guide 1 is limited to a predetermined mode at the time of opening the slide door SD.

Further, in the full-open state of the slide door SD, the second section S2 turns into in a mode extending toward the second support member 30 while being reversed in the approximately J-shape (a second bending mode).

At the time of closing the slide door SD, it is bent and deformed in the reserve mode to that described above.

According to the cable support structure formed in the manner described above, the structure is made such that the first support member 20 and the second support member 30 support one end portion and another end portion of the cable guide 1 in a state capable of swinging one end portion and another end portion in the vertical direction T. Accordingly, even in the case where the attitude angle θ of the slide door SD with respect to the vertical direction T is changed in correspondence to the slide movement, or the vertical position is changed, it is possible to prevent the unreasonable force from being applied to the cable guide 1 due to the attitude change or the position change, and it is possible to correspond to the attitude angle change or the position change of the slide door SD with respect to the vertical direction.

Further, since the cable guide 1 is extended toward the second support member 30 after being extended so as to move apart from the vehicle main body B side, it is possible to prevent the cable guide 1 from being interfered with the other members at the vehicle main body B side, in the present embodiment, the slide door frame rear body Ba at the vehicle main body B side and the rail RL for the slide door SD.

In particular, the first section S1 includes the section S1a in which a plurality of link members 3 are connected so as to be freely bent only in one direction from the linear state, and the section S1b in which a plurality of link members 3 are connected so as to be freely bent in both the directions from the linear state. Accordingly, it is possible to easily differentiate the modes in which the cable guide 1 moves apart from the vehicle main body B side, between the first bending mode and the second bending mode.

Further, since the second section S2 of the cable guide 1 is also set to be capable of being bent only in one direction, it is possible to prevent the second section S2 from being interfered with the other members.

Further, one end portion of the cable guide 1 is supported by the first support member 20 so as to be slanted to the rear side of the vehicle. Accordingly, at the time of opening the slide door SD, a force applied to the longitudinal direction of the second section S2 in the cable guide 1 is easily converted into a force for smoothly bending the first section S1 or the like in the reverse direction, whereby it is possible to smoothly bend and deform the cable guide 1 from the first bending mode to the second bending mode while preventing the buckling of the second section S2.

Further, since the cable guide 1 is covered with the bendable tubular tube body 40, it is possible to achieve a waterproof and dustproof against the cable 2. Further, it is possible to prevent noise caused by play between the link members 3.

What is claimed is:

1. A cable support structure for supporting a cable arranged between a first member and a second member which relatively move along a predetermined moving direction, comprising:
    a cable guide, formed by a plurality of linearly connected link members, for guiding said cable;
    a first support member, provided on said first member side, for supporting one end portion of said cable guide; and
    a second support member, provided on said second member side, for supporting another end portion of said cable guide, wherein
    at least one of said first support member and said second support member supports said one end portion or said another end portion of said cable guide in a state capable of swinging said cable guide in a direction approximately perpendicular to said predetermined moving direction and approximately perpendicular to a bending direction of the link members.

2. The cable support structure according to claim 1, wherein
    said first member is a main body of a vehicle, and said second member is a slide door.

3. The cable support structure according to claim 2, wherein
    both said first support member and said second support member support said one end portion and said another end portion of said cable guide in said state capable of swinging them in a vertical direction, respectively.

4. The cable support structure according to claim 3, wherein,
    said first support member includes:
    a first fixation member, fixed to said first member side, for supporting said one end portion of said cable guide; and
    a first connection member interposed between said one end portion of said cable guide and said first fixation member, and
    said first fixation member axially supports said first connection member connected to said one end portion of said cable guide so as to freely rotate around an axis corresponding to said vertical direction.

5. The cable support structure according to claim 3, wherein
    said second support member includes:

a second fixation member, fixed to said second member side, for supporting said another end portiou of said cable guide; and a second connection member interposed between said another end portion of said cable guide and said second fixation member, and said second fixation member axially supports said second connection member connected to said anotber end portion of said cable guide so as to freely rotate around an axis corresponding to said vertical direction.

* * * * *